United States Patent [19]

Posma et al.

[11] Patent Number: 4,633,147
[45] Date of Patent: Dec. 30, 1986

[54] ELECTRIC POWERED VEHICLE AND METHOD OF PROPELLING THE SAME

[75] Inventors: Bonne W. Posma, Youngstown, N.Y.; Rowland A. Hill, Wortland, Ky.

[73] Assignee: National Mine Service Company, Pittsburgh, Pa.

[21] Appl. No.: 719,258

[22] Filed: Apr. 3, 1985

[51] Int. Cl.$^4$ .............................................. B61C 15/12
[52] U.S. Cl. ........................................ 318/52; 318/49; 318/113; 318/139
[58] Field of Search ................... 318/52, 49, 113, 139, 318/246, 293, 484, 63

[56] References Cited

U.S. PATENT DOCUMENTS

| | | | |
|---|---|---|---|
| 2,315,386 | 3/1943 | Baldwin | 318/52 |
| 2,361,168 | 10/1944 | Baston | 318/52 |
| 2,773,227 | 12/1956 | Lillquist | 318/52 |
| 2,930,957 | 3/1960 | Cronberger | 318/113 X |
| 4,465,142 | 8/1984 | Lely et al. | 364/426 X |
| 4,489,256 | 12/1984 | Brodsky | 318/63 X |

FOREIGN PATENT DOCUMENTS

| | | | |
|---|---|---|---|
| 0207523 | 3/1984 | German Democratic Rep. | 318/139 |
| 0933491 | 6/1982 | U.S.S.R. | 318/246 |

*Primary Examiner*—William M. Shoop, Jr.
*Assistant Examiner*—Bentsu Ro
*Attorney, Agent, or Firm*—Stanley J. Price, Jr.

[57] ABSTRACT

An electric powered vehicle or the like includes a first mechanical drive system for a first side of the vehicle and a second mechanical drive system for a second side of the vehicle. A first DC motor and a second DC motor are respectively coupled to the first mechanical drive system and the second mechanical drive system. A source of DC power is on the vehicle. The first DC motor has a first field and a first armature and the second DC motor has a second field and a second armature. The first field, the first armature, the second field, and the second armature are connected in a series circuit with the source of power. A voltage sensing relay across the first armature can detect a high voltage across the first armature to sense a loss of traction of the first mechanical drive system. A switching circuit is employed to disable the first motor from the series circuit in response to the voltage sensing relay. There is also included a method for providing propulsion for an electric powered vehicle when a mechanical drive system at one side thereof experiences a loss of traction.

25 Claims, 3 Drawing Figures

ELECTRIC POWERED VEHICLE AND METHOD OF PROPELLING THE SAME

BACKGROUND OF THE INVENTION

1. Field of the Invention

This invention relates to an electric powered vehicle or the like of the type which includes a pair of DC motors respectively coupled to independent mechanical drive systems at opposite sides of the vehicle and, more specifically, to such a vehicle which includes a means for detecting a slipping condition of one of the drive systems and a means for insuring that the other of the drive systems will propel the vehicle.

2. Description of the Prior Art

It is quite common in the operation of mines or the like to employ an AC or DC power source to generally provide power to various vehicles used in the mines. The AC power source is converted at the vehicle to DC power or the DC power is chopped at the vehicle to operate DC motors which specifically provide power to the wheels of the vehicle. Often, one DC traction motor is used to drive the wheels on one side of the vehicle and another DC traction motor is utilized to drive the wheels on the other side of the vehicle. Of course, as the vehicle goes around a corner to speed of the outside wheels and their related motor will be higher than the speed of the inside wheels and their related motor.

If one utilizes the same source of DC power for the two DC motors and they are connected in parallel, the motors would be subjected to the same voltage, but not necessarily the same current. The major advantage of such a parallel system is that full tractive effort can always be developed by either motor regardless of the speed of the other. Should the wheels on one side of the vehicle loose traction and spin out, full traction can be developed at the other side of the vehicle. On the other hand, since there is no torque sharing between the two motors, this system has inherit disadvantages. Specifically, on cornering, the inside and outside wheels attempt to turn at the same rate causing excessive currents and torques to be generated by the drive motor for the inside wheels. This can in turn cause severe loads to be produced on the drive train for the inside wheels and can cause uneven tracking of the wheels.

On the other hand, if the DC traction motors are connected in series with each other, equal torque sharing is insured since the motors are always subjected to the same current. Since the voltage across each motor can vary in a series system, this system provides a differential effect while concerning with maximized wheel tracking and optimum power efficiency. However, should the wheels on one or the other side of the vehicle loose traction and begin to spin out, very little traction could be developed by the DC motor for the wheels on the other side of the vehicle. In fact, if one set of wheels continues to slip in this manner, the vehicle might be completely demobilized.

There remains a need for providing a mine vehicle having a motor control system which employs a pair of DC motors connected in series which can utilize the inherent advantages of such a system while eliminating the disadvantages thereof. Specifically, it would be desirable to be able to detect a spin-out condition on one set of wheels and, upon such detection, to insure that the other set of wheels which are not spinning is provided with full torque to propel the vehicle.

SUMMARY OF THE INVENTION

In accordance with the present invention there is provided an electric powered vehicle or the like including a first mechanical drive system for a first side thereof and a second mechanical drive system for a second side thereof. A first DC motor and a second DC motor are respectively coupled to the first mechanical drive system and the second mechanical drive system. There is a source of DC power on the vehicle. The first DC motor has a first field and a first armature and the second DC motor has a second field and a second armature. The first field, the first armature, the second field, and the second armature are connected in a series circuit with the source of power. There is included sensing means for sensing a loss of traction for the first mechanical drive system and switching means for disabling the first motor from the series circuit in response to the sensing means.

Further in accordance with the present invention, there is provided timing means for maintaining the disconnecting of the first motor for a predetermined time.

Additionally, there is provided a method for providing propulsion for an electric powered vehicle of the type described.

These and other objects of the present invention will be more completely disclosed and described in the following specification, the accompanying drawings, and the appended claims.

DETAILED DESCRIPTION OF THE PREFERRED EMBODIMENTS

Figure 1:
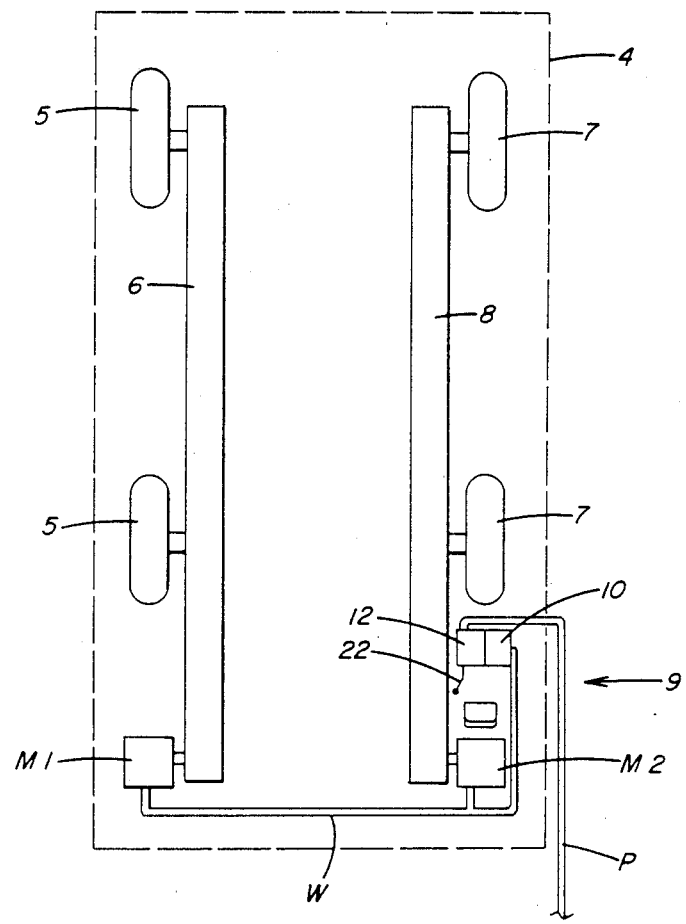
FIG. 1 is a schematic top view of a preferred electric powered vehicle including various features of the invention.

As seen in FIG. 1, a schematic view of the preferred electric powered vehicle 4 which can be utilitzed in the operation of mines and includes a first DC motor M1 and a second DC motor M2. The first DC motor M1 and the second DC motor M2 are respectively coupled to mechanical drive systems at opposites sides of the vehicle 4. Specifically, the mechanical drive system associated with the first DC motor M1 includes a pair of wheels 5 and a mechanical drive train 6. Similiarly, the mechanical drive system associated with the second DC motor M2 includes a pair of wheels 7 with a mechanical drive train 8. Typically, AC power is provided to the vehicle 4 through a power cable P and might include a cable reel or other similiar device for collection of the power cable P thereon. Of course, it would be possible for a DC source of power to be provided and to then employ a means for chopping the DC power for use on the vehicle 4. However, for the purposes of teaching the preferred embodiment of the invention, only the use of AC power will be specifically discussed or shown in the drawings while recognizing that one skilled in the motor control art would be able to employ a DC source of power to practice the invention. An operator control station 9 on the vehicle 4 includes a means for taking the AC power and converting it to DC power for the motors M1, M2. In the preferred configuration, the operator would utilize a movable control lever 22 to control a reversible, variable AC to DC controler 12 to provide the source of DC power for the motors M1, M2. Specifically, wiring cables or bundles W would connect a preferred motor control system 10 to the motors M1, M2 to regulate the propulsion of the vehicle in forward or reverse directions and at the speed as desired by the operator.

Figure 2:
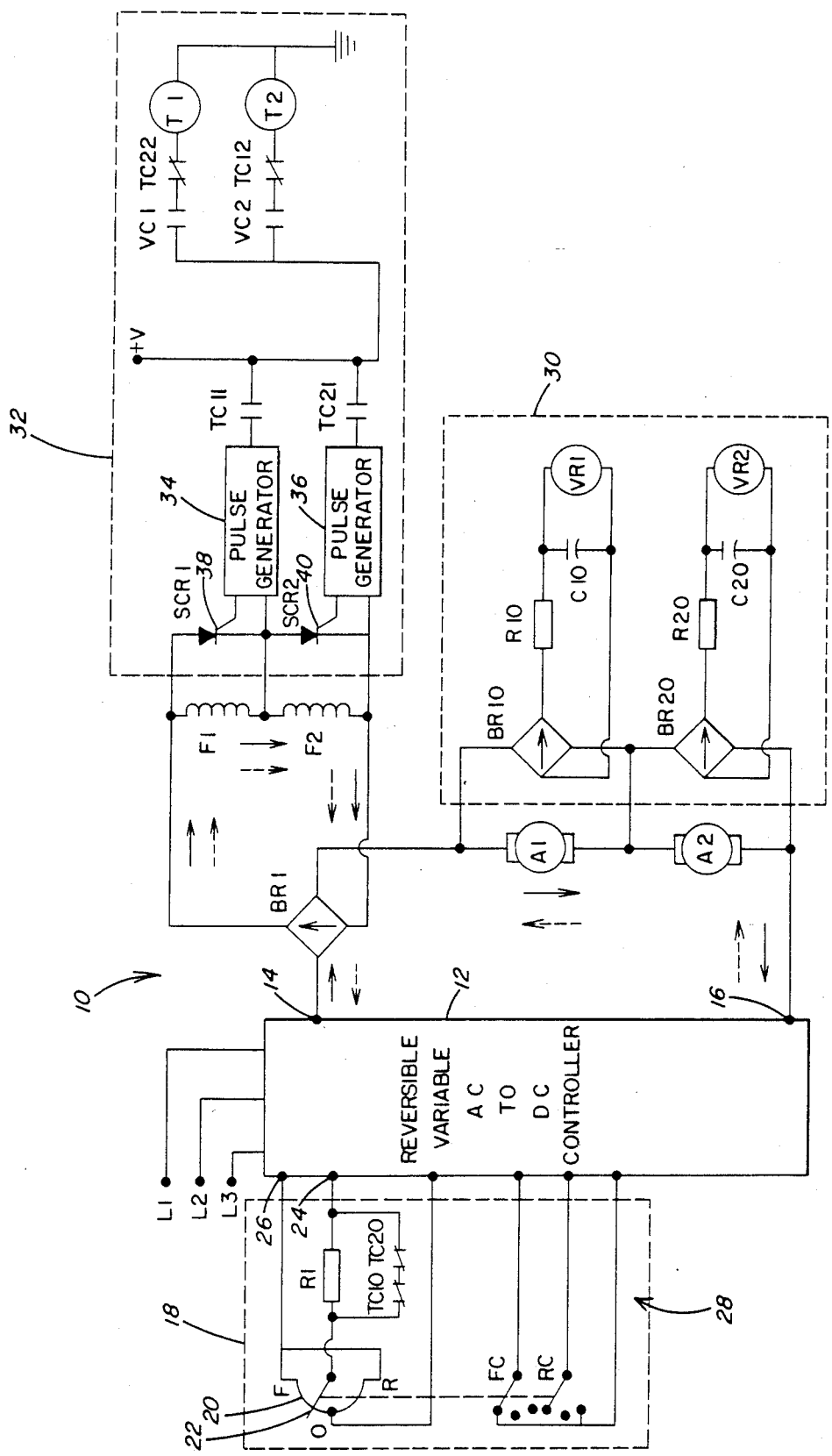
FIG. 2 is a schematic view of a preferred motor control system for the vehicle of FIG. 1 including various features of the invention.

As seen in FIG. 2, a schematic view of a preferred motor system 10 for the vehicle 4 includes the reversible, variable AC to DC controller 12 which is well-known in the motor control art and is capable of converting the incoming alternating current at lines L1, L2, and L3 to a reversible and variable DC output voltage potential between output terminal 14 and output terminal 16.

The first DC motor M1 includes a first field F1 and first armature A1. The second DC motor M2 includes a second field F2 and second armature A2. The motors M1, M2 are connected in a series circuit with the controller 12 such that current will always flow in one direction through the fields F1, F2 while it is reversed in the armatures A1, A2 when the vehicle 4 is to be operated in a reverse direction. This is accomplished by providing a four diode bridge BR1 for the fields F1, F2 in series with the armatures A1, A2. Specifically, when terminal 14 is positive with respect to terminal 16 for operation in a forward direction, the current will flow as indicated by the solid arrows from terminal 14 through the bridge BR1 and fields F1, F2 and in the direction as indicated through the armatures A1, A2. On the other hand, when the vehicle is to be operated in the reverse direction, terminal 16 will be positive with respect to terminal 14 and the current will flow as indicated by the broken arrows. For reverse direction, the current will flow from terminal 16 through the armatures A1, A2 in the opposite direction from that employed for operation in the forward direction and through the bridge BR1 to again cause current to pass in the same direction as mentioned hereinabove for the fields F1, F2.

With the system as thus described, there are particular advantages for the series connection of the first motor M1 and the second motor M2. Since the same current flows through both armatures A1, A2 and fields F1, F2, the torque produced by both motors M1, M2 the same. However, the RPM's of each motor M1, M2 can vary to suit the operating conditions of the vehicle 4, such as that when the vehicle 4 is turning. As described hereinabove, the vehicle 4 can operate in a manner similar to an automobile having a mechanical differential system.

On the other hand, as with a standard automobile, if one set of wheels is in a loss of traction, that is, a slipping condition, and the other set of wheels are on a non-slippery surface, it would be possible to lose overall traction for movement of the vehicle. If, for example, there were a loss of traction for the first mechanical drive system of the first motor M1, the first armature A1 would be spinning rapidly and producing a large back EMF which would result in almost all of the voltage produced by the controller 12 appearing across the armature A1. In such a situation, there would be very little voltage left for the armature A2 of the second motor M2 so that it would not tend to rotate or produce any back EMF across the second armature A2. If, on the other hand, there were provided a means for preventing the voltage from being applied across the first field F1, then the above described counter EMF would not be produced across the first armature A1. This condition would then result in sufficient voltage being applied to the second armature A2 to allow the second motor M2 to propel the vehicle.

If the wheels 5 associated with the first motor M1 are slipping excessively, the first motor M1 would be operating at a high speed but would be sensing a low load condition because of the lack of frictional resistance at the wheels 5. On the other hand, the wheels 7 associated with the second motor M2, which has little power because of the back EMF on the first motor M1, would operate at a low speed and be capable of moving only a low load because of the lack of available power. It is an object of the present invention to provide a sensing means for sensing a loss of traction on one of the mechanical drive systems which would produce a low load, high speed condition of its motor and a low load, low speed condition of the other of the motors and a means for disabling or disconnecting the one motor from the series circuit in response to the sensing means. Consequently, the power from the controller 12 would provide current flow to only the field of the other motor to insure that it will be capable of propelling the vehicle 4 alone.

In order to better understand the preferred motor control system 10, it is best to discuss some of the details of a preferred operator control means 18 which is utilized to provide magnitude and directional input for the controller 12. In the preferred operator control means 18, there is provided an operator's potentiometer 20 having a movable control lever 22. As seen in FIG. 2, the control lever 22 is positioned in a forward direction F to provide an operator control voltage at terminals 24 and 26 which will establish the magnitude of the output voltage between terminals 14 and 16. Operator control signal current will pass through the potentiometer 20 and normally closed timer contacts TC10 and TC20 which will be discussed in detail hereinbelow. Accordingly, during normal vehicle operations, the operator control signal current will not pass through resistor R1 which will also be discussed in detail hereinbelow. If the operator were to reverse the lever 22 to provide a similar signal in a reverse direction R, the magnitude of the operator control voltage would be the same to produce a similar output voltage level between terminals 14 and 16.

In order to indicate to the reversible, variable controller 12 which direction the current is to flow relative to the terminals 14 and 16, additional signalling circuitry 28 is provided. Specifically, circuit 28 includes a forward contact FC and a reverse contact RC which are coupled to the lever 22 to be responsive to the direction in which the lever 22 is placed by the operator. On the other hand, if the lever 22 is placed in an off position O, neither contact FC or RC will be closed and a lack of signal from circuit 28 will prevent any output voltage from being supplied to terminals 14, 16.

To provide a preferred sensing means for sensing the excessive loss of traction of either of the mechanical drive systems associated with the motors M1, M2, the preferred motor controls systems 10 includes a sensing circuit 30. Specifically, the sensing circuit 30 is intended to detect a high voltage across the armature A1, A2 of one of the motors M1, M2 which would tend to produce relatively low voltage across the armature A1, A2 of the other motor M1, M2. This is accomplished in the preferred sensing circuit 30 by voltage sensing relays VR1 and VR2 which are respectively provided to sense the voltage across the first armature A1 and the second armature A2. The voltage sensing relays VR1, VR2 are set to function at a level, which will be discussed in detail hereinbelow, indicating a high voltage condition that could only occur during excessive slippage. Specifically, full wave rectifier bridges BR10 and BR20 are connected across armatures A1 and A2 to furnish unipolar DC voltage to voltage sensing relays VR1 and VR2, independent of the polarity of the motors M1, M2. A resistor R10 and capacator C10 and resistor R20 and capacator C20 are provided for damping action of each circuit to prevent transient voltages across the armatures from being sensed by the voltage sensing relays VR1 and VR2.

To provide a switch means for disabling the motor which is in a slipping condition, a preferred switching circuit 32 is provided the motor control system 10. Specifically, the switching circuit 32 employs a timing means to insure that the slipping motor will remain disabled or disconnected from the series circuit for a predetermined time to allow propulsion to be provided by the other motor. Although a timing means of a different type could be used to simply reconnect the motor or to positively prevent continued disconnection of the motor after a predetermined time, the preferred motor control system 10, employs a timing device which intiates the disabling or disconnecting of the switch means for a predetermined time. After the predetermined time has expired, the switch means will no longer function to disable the motor which had been slipping from the series circuit.

The preferred timing means includes a first timer T1 and a second timer T2 which are of a type which is well known in the motor control art. The first timer T1 is connected in series with a normally open voltage relay contact VC1 and a normally closed timer contact TC22 which will be discussed hereinbelow. Similarly, the second timer T2 is connected in series with a normally open voltage relay contact VC2 and a normally closed timer contact TC12 which will also be discussed hereinbelow. The first voltage relay contact VC1 and the second voltage relay contact VC2 will be respectively closed by signals from the first voltage sensing relay VR1 and the second voltage sensing relay VR2. Specifically, the first timer T1 is activated by the first voltage sensing relay VR1 and the second timer T2 is activated by the second voltage sensing relay VR2 when the respective voltage sensing relay VR1, VR2 senses a high voltage across its corresponding armature A1, A2. Preferably the timers T1, T2 are each set to operate for about three to ten seconds in the preferred switching circuit 32. It should be understood that the duration of the setting for each of the timers T1, T2 is intended to prevent any transient condition between the first and second motors so that there will be a positive disabling of the one slipping motor for a predetermined time to allow the other motor to have an opportunity to provide traction to the vehicle. Accordingly, the timers T1, T2 might be set at any appropriate time and may even be configured to provide a varying amount of time for disabling one or the other of the motors depending on the type of vehicle on which the preferred motor control system is being employed or the type of conditions under which it might be expected that the vehicle will be operated.

When the first timer T1 is activated, normally closed timer contact TC10 will open, normally open timer contact TC11 will close and normally closed timer contact TC12 will open. Similarly, when second timer T2 is activated, normally closed timer contact TC20 will open, normally open timer contact TC21 will close, and normally closed timer contact TC22 will open. When contact TC11 or contact TC21 is closed, there is a resulting respective disabling of the first motor M1 or the second motor M2 for the series circuit. Specifically, the switch means of the preferred motor control system 10 will accomplish this function by closing a by-pass circuit around the corresponding first field F1 or second field F2 of the first and second motors. In the preferred switching circuit 32, a first silicon controlled rectifier SCR1 is in a by-pass circuit around the first field F1 and a second silicon controlled rectifier SCR2 is in a by-pass circuit around the second field F2. Normally, the silicon controlled rectifiers SCR1 and SCR2 prevent any current flow in the by-passes around the fields F1 and F2 and, therefore, prevent the by-pass circuits from disabling either of the motors M1, M2 from the series circuit. However, when contact TC11 or contact TC21 is closed, current from the switching circuit 32 is provided to a pulse generator 34 or 36, which pulse generators are well known in the motor control art. When so activated, a pulse generator 34 or 36 will respectively emit a stream of pulse signals to the gate 38 or 40 of silicon controlled rectifier SCR1 or SCR2 for the predetermined time to conduct current through the corresponding silicon controlled rectifier SCR1 or SCR2 to cause the appropriate field F1 or F2 to be by-passed.

Additionally, as mentioned hereinabove, when the first timer T1 is activated, the contact TC10 in the operator control circuit 18 will open and the contact TC12 in the second timer T2 circuit will open. Similarly, when the second timer T2 is activated, the contact TC20 in the operator control circuit 18 will open and the contact TC22 in the first timer T1 circuit will open. The function and purpose of these contacts TC10, TC12, TC20, and TC22 will be understood from the description provided hereinbelow.

To more clearly understand the operation of the preferred motor control system 10, it is appropriate to include some specific examples of the voltage levels and other operating features included in the system. For example, a typical reversible, variable controller 12 might be capable of operating at a predetermined maximum voltage level of about 500 volts. In such a maximum voltage operating condition, during normal operation of the vehicle, the voltage sensed by both voltage sensing relays VR1 and VR2 would be about 250 volts. If, on the other hand, there were to be experienced some loss of traction for the mechanical device system operated by the first motor M1, the voltage across the first armature A1 could be about 350 volts and the voltage across the second armature A2 could be about 150 volts. In this condition, in the preferred motor control system 10, the slippage would not be sufficient to warrant bypassing the first field F1 and it would be expected that the second motor M1 would be able to propel the vehicle 4 to some degree. Accordingly, the preferred voltage sensing relays VR1 and VR2 are set to function at a slightly elevated level of 375 volts so that activation of the relays will more than likely occur when one of the mechanical drive systems has lost traction and is positively slipping and propulsion of the vehicle 4 is unlikely. Although it would be possible for one to set the voltage sensing relays to function at a voltage greater than half of the predetermined maximum voltage level of the controller 12 in order to recognize that one of the motors is operating at a higher level than the other motor, such a setting would be too sensitive and would be too likely to by-pass the field of the slipping motor on occasions when it is really not desired. As a result, the preferred set voltage level for the voltage sensing relays VR1 and VR2 for the motor control system 10 is approximately 75 percent of the predetermined maximum voltage level of the controller 12.

It should be noted that, whenever the field F1 or F2 of either motor is by-passed, the entire voltage from the controller 12 could be applied to the field of the other motor. If one were operating at a lower operating level, less than the predetermined maximum voltage level, the output from the controller 12 might not damage the operating motor. However, since the voltage sensing relays VR1, VR2 would be activated at 375 volts, during such an operation, the voltage output of the controller 12, as determined by the operator, would at least be expected to be at a level of 375 volts. Since such an output voltage could damage the operating motor, the operator control circuit 18 is provided a means for reducing the input signal to the controller 12 to limit controller 12 to be capable of only a reduced maximum voltage level during the by-passing of the field of the motor which is in a lost traction condition. Specifically, the opening of contacts TC10 or TC20 will cause the resistor R1 to be added to the operator control circuit to reduce the signal current being provided at terminal 24 of the controller 12. In the preferred motor control system 10, the operator control signal current which is generated when the potentiometer 20 is in its maximum F or R position would be at a maximum voltage reference level to establish the predetermined maximum voltage level of 500 volts for the controller 12. However, in such a condition with an opening of contact TC10 or TC20, the resistor R1 would reduce the maximum voltage reference level to about one-half to cause the controller 12 to be capable of only operating at a reduced maximum output voltage of about 250 volts which would not be expected to damage the operating motor. The improvement to the operator circuit 18 is considered necessary in the preferred motor control system 10 in order to protect the motors. If each of the motors were rated to operate at the maximum output voltage of the controller 12, the limit on the output of the controller 12 would not be necessary. However, in most operations, the motors would not normally be rated to operate at the entire voltage which the controller 12 is capable of providing.

Additionally, when the first motor M1 is in a loss of traction condition and the first timer T1 is activated, there is provided a means for insuring that the second timer T2 will not be activated even if some signal indicating a higher voltage is received from the second voltage sensing relay VR2. As mentioned hereinabove, when the first timer T1 is activated for the predetermined time, the normally closed contact TC12 will open so that subsequent closing of the voltage relay contact VC2 would not produce activation of the second timer T2. Similarly, the second timer T2 would open contact TC22 in the circuitry of the first timer T1 to prevent its activation if the second motor M2 were in a loss of traction condition.

Although the preferred motor control system as described hereinabove would provide a means for preventing a motor experiencing a loss of traction from taking all of the power output from the controller 12 when it is being operated in a full power condition, there are limitations on the system if the operator is not operating at full power. For example, if the operator were operating at half power with the controller 12 providing 250 volts and one of the motors were to be in a loss of traction condition, there would only be 250 volts sensed across the armature of that motor. As indicated above, 250 volts would not be sufficient to activate the voltage sensing relay for producing a by-passing of a field of the slipping motor. On the other hand, as mentioned hereinabove, one could not simply lower the preferred level for activating the voltage sensing relay because of the possibility of sporadic activation during normal operating conditions with maximum power being provided by the controller 12.

Figure 3:
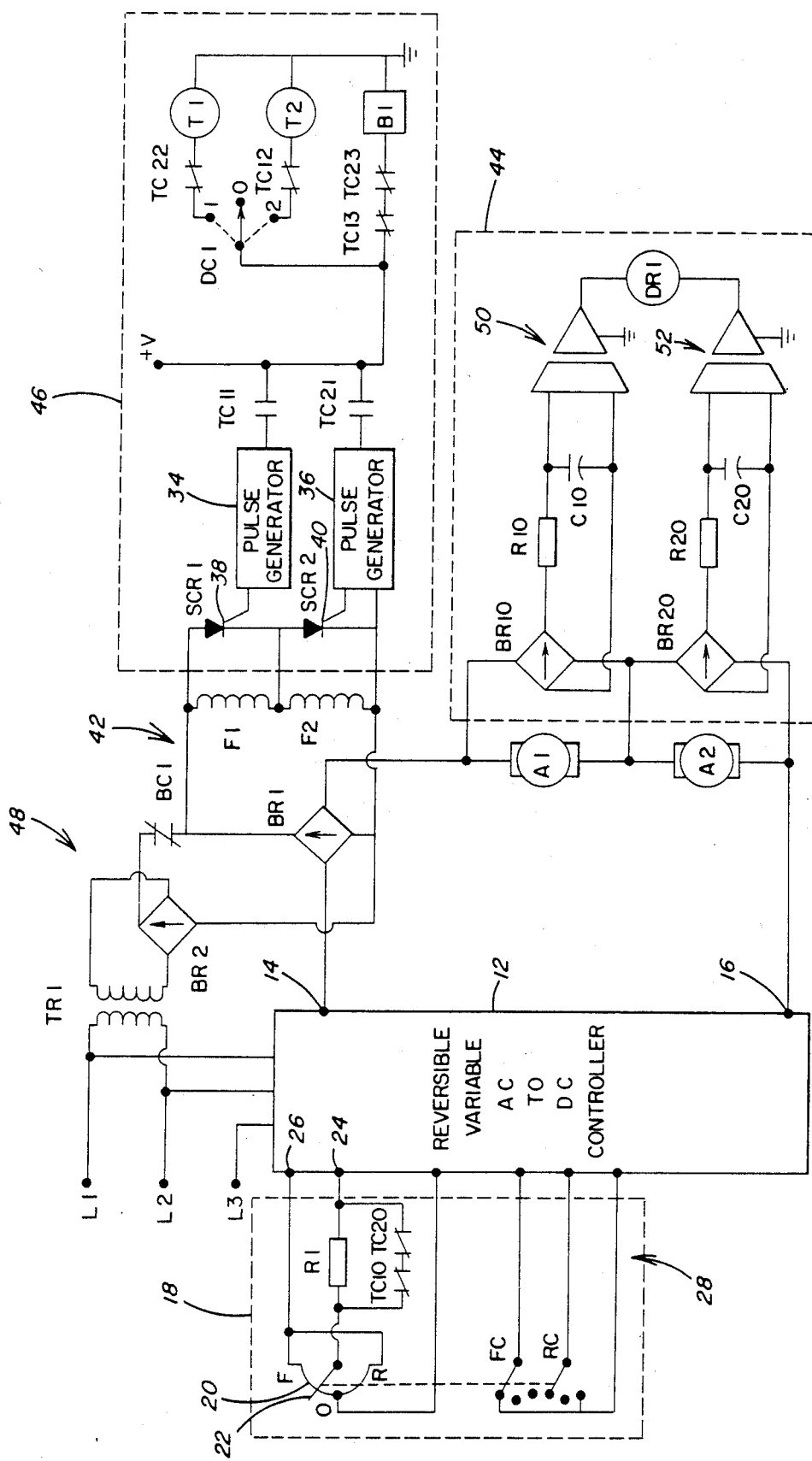
FIG. 3 is a schematic view of an alternative motor control system including a field biasing circuit and various features of the invention.

As seen in FIG. 3, an alternative motor control system 42 would tend to eliminate this operational limitation. The motor control system 42 includes an alternative sensing circuit 44 and alternative switching circuit 46 and also includes a field biasing circuit 48. The field biasing circuit 48 provides a low voltage power supply to the fields F1, F2 independent of the controller 12. The preferred field biasing circuit 48 would include a transformer TR1 and bridge BR2 to insure that biasing current will pass through the fields F1, F2 in the same direction as current from the controller 12. A normally closed biasing contact BC1 is in the circuit to allow field biasing current to pass to the fields during normal operations of the vehicle 4. It has been found that providing such a low voltage bias supply can improve the operating characteristics of the DC motors in special situations which are totally independent of the situation wherein one set of wheels is slipping and its mechanical drive system has experienced a loss of traction as has been discussed primarily hereinabove. Although field biasing would not normally have an effect on the motors M1, M2 during normal, straight, level operation of the vehicle 4, it would not be desirable to apply biasing to the field of the motor during a condition when the wheels are slipping. Accordingly, there is provided means for preventing field biasing to the field which is being by-passed which means will be discussed in detail hereinbelow.

Although the preferred motor control system 10 included a means for indicating one of the motors was in a loss of traction condition relative to the other motor by the setting on the voltage sensing relays VR1, VR2, the alternative motor control system 42 includes a sensing circuit 44 which specifically compares the voltage drops across the armatures A1, A2. In the alternative sensing circuit 44, voltage is again sensed across the armature A1 by the use of a bridge BR10, resistor R10, and capacitor C10. Similarly, voltage is sensed across the second armature A2 with a bridge BR20, resistor R20, and capacitor C20. However, voltage across armature A1 is then provided to an isolation buffer 50 while the voltage across armature A2 is provided to an isolation buffer 52. Although only one such isolation buffer could be employed, the result is that the output of the isolation buffers 50, 52 can then be provided to a differential sensing relay DR1 to directly compare the magnitude and direction of the voltage difference across the armatures A1, A2.

The switching circuit 46 is similar to the switching circuit 32 as described hereinabove but includes means for utilizing the information obtained from the differential sensing relay DR1 and means for preventing field biasing when either of the fields F1, F2 of the motors is to be by-passed. Specifically, a differential contact DC1 is controlled by the differential sensing relay DR1 to be in one of three positions depending upon the signals received therefrom. With the differential sensing relay DR1 being set to function at a predetermined differential voltage, the differential contact DC1 will switch to the appropriate timer T1, T2 to initiate by-passing of the field F1, F2 of the motor which is operating at the higher differential voltage. On the other hand, if the magnitude of the voltage differential of the voltages at the armatures A1, A2 is below the preset value, the differential contact DC1 will remain in the zero position so that neither of the timers T1, T2 will be activated. If there is a loss of traction condition as sensed by the setting on the differential sensing relay DR1, the timers T1, T2 would respectively switch the contacts TC10, TC11, TC12 and the contacts TC20, TC21 and TC22 from their normal positions as shown in FIG. 3. As thus described, the alternative switching circuit 46 would function in the same manner as did the preferred switching circuit 32.

However, there is also included means in the alternative switching circuit 46 for removing the field biasing as provided by the field biasing circuit 48 described hereinabove. Specifically, when timer T1 is activated the normally closed contact TC13 would open to deactivate a biasing relay B1 which would in turn cause the biasing contact BC1 to open. Similarly, if the timer T2 were activated, the normally closed contact TC23 would be open to deactivate the biasing relay B1 to open biasing contact BC1. Accordingly, during operation of either timer T1, T2 there would be no field biasing for either of the fields F1, F2. Although field biasing circuit 48 as described is preferred, there could be other means for providing field biasing to the fields F1, F2. If, for example, field biasing were to be separately supplied to the fields F1, F2 then an alternative means could be employed to prevent biasing to only the field which is being by-passed. In other words, there would be no harm in providing field biasing to the operating motor but the use of a common source of field biasing for the two motors in the preferred configuration requires that the entire low voltage biasing supply to be eliminated during a by-passing of either of the fields F1, F2.

It should be clear that the alternative sensing circuit 44 could be employed in a motor control system similar to the preferred motor control system 10 by eliminating the functions relating to the field biasing circuit 48 in the switching circuit 46. With such a configuration, one would initially assume that the alternative motor control system 42 would function in a similar manner to be preferred motor control system 10. However, using the same examples for typical voltage levels and other operating features, as described hereinabove for the motor control system 10, will reveal additonal advantages of the alternative motor control system 42. Again, if the typical reversible, variable controller 12 were capable of operating at a predetermined maximum voltage level of about 500 volts, the differential sensing relay DR1 could be set to function when the voltage across one of the armatures A1, A2 is at about 375 volts while the voltage across the other of the armatures A1, A2 is about 125 volts. Accordingly, the preferred differential sensing relay DR1 could be set to function at a level of 250 volts differential between the armatures A1, A2. However, with such a setting on the differential sensing relay DR1, if the controller 12 were being operated at only 250 volts, it would be possible to initiate the disconnecting of a slipping motor if the armature thereof were rotating at such an excessive speed that 250 volts were generated thereby and 0 volts were being generated across the armature of the nonslipping motor because it was not moving at all. Accordingly, with such a configuration, the entire system could on occasion be expected to function even though the controller 12 were not being operated at the predetermined maximum voltage level of 500 volts.

Although the embodiments described hereinabove include preferred means for providing an electric powered vehicle and a related motor control system of the invention, there are numerous alternatives which could be made without departing from the invention as claimed. Although it is expected that most vehicles used in mining operations would use the DC motors at opposite right and left sides of the vehicle, it would be possible to employ mechanical drive systems at opposite forward and rearward sides of the vehicle. Clearly, the present invention could be used to insure propulsion of such a vehicle if either the forward or the rearward mechanical drive system experienced a loss of traction. Further, different means could be utilized to prevent full power output from the controller to only a single operating motor without requiring the specific means as utilized in the operator control circuitry as described hereinabove. Additionally, although silicon controlled rectifiers are preferably used to by-pass the appropriate field during a loss of traction condition, other switching means well known in the art could be employed for this purpose. It should also be noted that, while the preferred timers are used to inate the preferred disconnecting of the loss of traction motor by by-passing its field, the relay associated with the sensing means could directly activate such by-pass switching and a seperate form of timing means could be used to reconnect the motor to the series circuit after the predetermined time. Consequently, these and other alternatives could be made to the embodiments as described hereinabove without departing from the scope of the invention as claimed.

We claim:

1. An electric powered vehicle or the like comprising:

a first mechanical drive system for a first side of said vehicle;

a second mechanical drive system for a second side of said vehicle;

a first DC motor and a second DC motor respectively coupled to said first mechanical drive system and second mechanical drive system;

a source of DC power on said vehicle;

said first DC motor having a first field and a first armature, said second DC motor having a second field and a second armature;

said first field, said first armature, said second field, and said second armature being connected in a series circuit with said source of power;

sensing means for sensing a loss of traction for said first mechanical drive system;

switch means for disabling said first motor from said series circuit in response to said sensing means, and timing means for maintaining said disconnecting of said first motor for a predetermined time.

2. The vehicle as set forth in claim 1, wherein said sensing means includes detecting means for detecting a high voltage across said first armature of said first motor.

3. The vehicle as set forth in claim 2, wherein said detecting means includes a voltage sensing relay to operate said switch means.

4. The vehicle as set forth in claim 3, wherein said source of power is capable of operating at a predetermined maximum voltage level and said voltage sensing relay is set to function at a predetermined voltage level greater than one half of said predetermined maximum voltage level.

5. The vehicle as set forth in claim 4, wherein said predetermined voltage level is approximately 75% of said predetermined maximum voltage level.

6. The vehicle as set forth in claim 2, wherein said detecting means includes differential voltage determing means for determining a predetermined voltage differential between said high voltage and a lower voltage across said second armature of said second motor.

7. The vehicle as set forth in claim 6, wherein said source of power is capable of operating at a predetermined maximum voltage level and said predetermined voltage differential is less than about one half of said predetermined maximum voltage level to operate said switch means.

8. The vehicle as set forth in claim 6, wherein said differential voltage determining means includes a differential voltage sensing relay connected respectively across said first armature of said first motor and said second armature of second motor with at least one isolation buffer means therebetween.

9. The vehicle as set forth in claim 1, wherein said switch means includes a by-pass circuit around said first field of said first motor having normally opened contact means therein which said contact means is capable of being closed by said sensing means.

10. The vehicle as set forth in claim 9, wherein said timing means includes a timing device for said contact means which said timing device is pre-set to cause said contact means to be closed for said predetermined time by said sensing means.

11. The vehicle as set forth in claim 10, wherein said contact means includes a silicon controlled rectifier which will conduct current therethrough when a signal initiated by said timing device is received at a gate thereof.

12. The vehicle as set forth in claim 1, wherein said source of power is normally capable of operating at a predetermined maximum voltage level and further including voltage limiting means for limiting said source of power to be capable of only a reduced said predetermined maximum voltage level during said predetermined time.

13. The vehicle as set forth in claim 12, wherein said reduced predetermined maximum voltage level is about one half of said predetermined maximum voltage level.

14. The vehicle as set forth in claim 12, wherein said source of power is variable and is controlled by an operator control signal reference voltage capable of being varied in magnitude from zero to a maximum reference voltage level, said maximum reference voltage level produces said predetermined maximum voltage level, and said voltage limiting means includes signal reference voltage limiting means for limiting said signal reference voltage to be capable of only a reduced said maximum reference voltage level.

15. The vehicle as set forth in claim 14, wherein said voltage limiting means includes means for directing said operator control signal reference voltage through resistor means.

16. The vehicle as set forth in claim 1, further including field biasing means across said first field of said first motor.

17. The vehicle as set forth in claim 16, further including field biasing disconnecting means for disconnecting said field biasing means from said first field during said predetermined time.

18. The vehicle as set forth in claim 1, further including additional sensing means for sensing a loss of traction for said second mechanical drive system; additional switch means for disabling said second motor in response to said additional sensing means; additional timing means for maintaining disabling of said second motor for a corresponding predetermined time; and means for preventing said switch means from disabling said first motor during said corresponding predetermined time and said additional switch means from disabling said second motor during said predetermined time.

19. The vehicle as set forth in claim 1, wherein said source of power is reversible and further including rectifier means for said first field and said second field in said series circuit to cause electrical current to flow in only one direction through said first field and said second field and in corresponding opposite directions through said first armature and said second armature when said source of power is reversed.

20. A motor control system for an electric power vehicle or the like of the type which includes a first mechanical drive system for a first side of said vehicle, a second mechanical drive system for a second side of the vehicle, a first DC motor and a second DC motor respectively coupled to said first and said second mechanical drive systems, said first DC motor having a first field and a first armature, and said second DC motor having a second field and a second armature, said motor control system comprising:
a source of DC power on said vehicle;
said first field, said first armature, said second field, and said second armature being connected in a series circuit with said source of power;
sensing means for sensing a loss of traction for said first mechanical drive system;
switch means for disabling said first motor from said series circuit in response to said sensing means, and timing means for maintaining said disabling of said first motor for a predetermined time.

21. The motor control system as set forth in claim 20, wherein said sensing means includes detecting means for detecting a high voltage across said first armature of said first motor.

22. The motor control system as set forth in claim 20, wherein said switch means includes a by-pass circuit around said first field of said first motor having normally opened contact means therein which said contact means is capable of being closed by said sensing means.

23. The motor control system as set forth in claim 20, wherein said source of power is reversible and further including rectifier means for said first field and said second field in said series circuit to cause electrical current to flow in only one direction through said first field and said second field and in corresponding opposite directions through said first armature and said second armature when said source of power is reversed.

24. A method of providing propulsion for an electric powered vehicle of the type which includes a first mechanical drive system for a first side of said vehicle; a second mechanical drive system for a second side of said vehicle; a first DC motor and a second DC motor respectively coupled to said first mechanical drive system and said second mechanical drive system; a source of DC power on said vehicle; said first DC motor having a first field and a first armature; said second DC motor having a second field and a second armature; and said first field, said first armature, said second field, and said second armature being connected in a series circuit with said source of power; said method comprising the steps of:

sensing a loss of traction of said first mechanical drive system;

disabling said first motor from said series circuit after sensing loss of traction for said first mechanical drive system, and maintaining disabling of said first motor for a predetermined time.

25. A reversible electric powered vehicle or the like comprising:

a first mechanical drive system for a first side of said vehicle;

a second mechanical drive system for a second side of said vehicle;

a first DC motor and a second DC motor respectively coupled to said first mechanical drive system and said second mechanical drive system;

a reversible source of DC power on said vehicle;

said first DC motor having a first field and a first armature, said second DC motor having a second field and a second armature;

sensing means for sensing a loss of traction for said first mechanical drive system irrespective of motion, switch means for disabling said first motor from said series circuit in response to said sensing means, and timing means for maintaining disconnecting of said first motor for a predetermined time, said source of power is normally capable of operating at a predetermined maximum voltage level and further including voltage limiting means for limiting said source of power to be capable of only a reduced said predetermined maximum voltage level during said predetermined time, and said reversible source of power is variable and is controlled by an operator control signal reference voltage capable of being varied in magnitude from zero to a maximum reference voltage level, said maximum reference voltage level produces said predetermined maximum voltage level, and said voltage limiting means including signal reference voltage limiting means for limiting said signal reference voltage to be capable of only a reduced said maximum reference voltage level.

* * * * *